3,740,357
PRODUCTION OF NO-GEL ELASTOMERIC FOAMS
Ludwig A. Wax, Westfield, Mass., assignor to Standard Brands Chemical Industries, Inc., Dover, Del.
No Drawing. Filed Apr. 9, 1971, Ser. No. 132,880
Int. Cl. C08d 13/08, 7/00
U.S. Cl. 260—2.5 L  17 Claims

ABSTRACT OF THE DISCLOSURE

A heat-curable foam-forming latex composition comprising a N-methylolacrylamide-containing diene terpolymer latex, a curing system, a foaming agent, and a foam stabilizer and a method for forming this composition into a no-gel foam.

---

This invention relates to stable, heat-curable latex compositions capable of producing elastomeric foams without the use of conventional foam gelling agents. More particularly, this invention relates to heat-curable foam-forming latex compositions comprising a N-methylolacrylamide-containing diene terpolymer latex, a curing system, a foaming agent, and a foam stabilizer; to methods for forming these compositions into no-gel foams, and to the no-gel foams produced therefrom.

Many attempts have been made to prepare stable, foamable, heat-curable compositions from rubbery latices without the use of gelling agents. For example, diene latices having a high soap content have been proposed for the production of foam rubber. The soap in this system serves as a foaming agent and as a stabilizer for the latex during foaming. Generally, foams prepared using soaps alone as stabilizers show a tendency to collpse during the heat-curing operation or produce commercially non-acceptable foam structures. This is especially the case when such foam structures are coated onto carpet backings and then cured. Some of the soap that is removed with the water vapor will collect in the carpet causing the carpet to foam when wet. In order to avoid such drawbacks, it is common practice to use a latex having a low soap content and to add a slow-acting gelling agent, such as an alkali metal silicofluoride to obtain a latex foam which retains a discrete cellular structure during the cure process.

In systems employing a silicofluoride as a gelling agent, it is necessary to prepare the latex, to foam the latex, to incorporate the gelling agent, and then to cure the foam. Significant problems of premature gelling and material loss usually result if the latex containing the gelling agent is not used immediately. Also, in using such conventional gelled foam systems considerable care must be taken when the gelling agent is added to the foam. If too little gelling agent is employed, not only will a poor foam product result, but in the case of foam-coated substrates, the foam is liable to separate and fall off. If this occurs in the drying and curing oven, the entire operation must be stopped immediately to allow removal of the foam and prevention of a fire hazard.

If too much gelling agent is introduced, a stiff, poor foam product will be obtained and coagulation of the latex with machine blockage may occur.

The synthetic rubber latices conventionally used for producing gelled foams are prepared by using cold polymerization techniques. The temperatures in this polymerization usually are in the range of about 0° to 4° C. These temperature conditions reduce the gel content of the resulting latex. Consequently, the latices produced in this manner may be used with gelling agents which, as heretofore noted, require considerable control during the foaming operation. It will be recognized that cold polymerization requires considerable effort to keep the reaction temperature at the required level. Much heat exchange is necessary since the polymerization reaction is exothermic.

In contrast, the foam-forming latices used in the present invention are produced at considerably higher temperatures. Consequently, these latices can be produced at a faster rate and may have a relatively high gel content resulting from the polymerization reaction.

Advantageously, the foam-forming latex composition of this invention also exhibits stability before and during the heat-curing process and the cured foams obtained have properties suitable for rug or carpet underlays, foam cushions, and the like. High-density, flameproof and heat-embossable, elastomeric foams may be produced from the latex compositions of this invention.

Also, in contrast with the known synthetic latices produced by cold polymerization which often require the addition of natural rubber latex to obtain the desired elastomeric properties when cured, the foam-forming heat-curable latices of the subject invention produce foams having the desired elastomeric properties without the addition of natural rubber.

This invention therefore contemplates a heat-curable foam-forming latex composition which comprises an admixture of a N-methylolacrylamide containing diene copolymer latex, a curing system, a foaming agent, and a foam stabilizer. This latex composition may further be compounded to contain cell detackifiers; anti-oxidants; fillers, such as hydrated alumina for fire retardancy; and pigments, such as calcium carbonate or carbon black; prior to foaming and heat-curing.

This invention is also directed to a method for producing elastomeric foams which comprises mixing selected proportions of (1) a stable latex of an elastomeric film-forming copolymer produced from a monomeric mixture containing from about 30 to about 70% by weight of an aliphatic conjugated diene, about 2 to about 10% by weight of N-methylolacrylamide, and a balance comprising one or more non-carboxylic ethylenically unsaturated monomers copolymerizable with the diene and N-methylolacrylamide; (2) a curing system capable of curing the diene terpolymer latex; (3) a foaming or frothing agent selected from the group consisting of anionic and nonionic surfactants; and (4) a foaming stabilizer which is a thermo-setting thickening agent; forming the mixture into a foam; and thereafter cell-stabilizing, drying, and curing the foam by the application of heat.

In addition, it has also been found that latex mixtures containing up to about 50% by weight of an elastomeric carboxylated diene copolymer as the secondary component or latex, e.g., a terpolymer produced from a monomeric mixture of 60 parts by weight of 1,3-butadiene, 37.5 parts by weight of styrene, and 2.5 parts by weight of acrylic acid by emulsion polymerization, and 50% or more by weight of the N-methylolacrylamide containing diene copolymer latex, e.g., one produced from a monomeric mixture of 50 parts by weight of butadiene, 46 parts by weight of styrene and 4 parts by weight of N-methylolacrylamide as the primary component or latex, the weight percentages being based on the total dry solids content of the latex mixture, provide compositions which form foams having acceptable compression resistance, compression set, and the like foam properties.

The aliphatic conjugated dienes suitable for preparing the N-methylolacrylamide-containing elastomeric latices include 1,3-diene hydrocarbons such as 1,3 - butadiene, 2 - methyl - 1,3 - butadiene (isoprene), 2,3-dimethyl-1,3-butadiene (diisopropenyl), 1,3 - pentadiene (piperylene), 2 - neopentyl - 1,3 - butadiene, the straight chain conjugated hexadienes, and other hydrocarbon homologs of 1,3-butadiene. In addition, substituted dienes, such as 2-chloro - 1,3-butadiene (chloroprene), 2-cyano-1,3-butadiene, and the like, are found suitable. In general, dienes containing more than 10 carbon atoms polymerize very slowly, if at all, in the present polymerization systems;

consequently, it is preferred to employ a diene having 10 carbon atoms or fewer. Dienes having from 4 to 6 carbon atoms have particularly advantageous reaction rates and polymerization characteristics, and therefore, are preferred. The 1,3-butadiene hydrocarbons, and 1,3-butadiene, in particular, are preferred.

The non-carboxylic ethylenically-unsaturated comonomer used to prepare the elastomeric latices of this invention is selected from among ethylenically-unsaturated monomers which are copolymerizable both with the aliphatic 1,3-diene and with N-methylolacrylamide. Ethylenically-unsaturated comonomers suitable for this purpose include styrene and substituted styrenes, acrylonitrile and substituted acrylonitriles, halogen-containing ethylenically-unsaturated aliphatic monomers, such as vinylidene chloride and trichloro-ethylene, and lower molecular weight acrylates such as methyl acrylate.

It has been found that the choice of these ethylenically-unsaturated comonomer influences the use for which the foams of this invention may be employed. A halogen-containing comonomer provides foam structures having outstanding fire-retardant properties; while latices containing styrene as comonomer are particularly suitable for producing high density foam structures.

Substituted styrenes useful in the practice of this invention include alpha-methylstyrene (isopropenylbenzene); propenylbenzene; 2,3, or 4 - methylstyrene; 2,3 or 4-ethylstyrene; propyl and isopropylstyrenes; alpha-ethylstyrene; 2,3 or 4-halostyrenes; 2,3 or 4-cyanostyrenes; the phenylstyrenes; and the like.

Halogen-containing ethylenically-unsaturated comonomers useful for this purpose are limited to vinyl monomers such as vinylidine chloride and trichloroethylene. Of these monomers, vinylidine chloride is preferred because it copolymerizes more readily in the systems employed than trichloroethylene and because it tends to produce a more rubbery copolymer.

Other ethylenically-unsaturated comonomers useful in the preparation of these primary latices include acrylonitrile itself and its substituted lower molecular derivatives, such as alpha-chloro-acrylonitrile, methacrylonitrile, ethacrylonitrile, and the like.

The acrylic esters useful as comonomers are the lower molecular weight alcohol esters of acrylic and substituted acrylic acids such as methyl acrylate, ethyl acrylate, methyl methacrylate, methyl ethacrylate, butyl acrylate, butyl methylacrylate, propyl methacrylate, isobutyl dichloro-acrylate and other acrylic esters of alcohols preferably having 1 to 6 carbon atoms. It is preferred to employ copolymerizable monoolefinic monomers selected from the group consisting of styrene, methyl methacrylate, acrylonitrile and vinylidene chloride.

The amounts of N-methylolacrylamide, aliphatic diene, and ethylenically unsaturated comonomer used in the preparation of the primary latices of this invention have been found to be critical. Suitable monomeric mixtures contain from about 30 to about 70% by weight of the conjugated diene or mixture thereof, more preferably from about 50 to 60% of conjugated diene; from about 2 to about 10% by weight of N-methylolacrylamide, preferably from about 3 to about 6% of the acrylamide; and a balance made up of the non-carboxylic monomers, i.e. from about 20 to about 68% by weight of the total mixture may be a non-carboxylic monomer. The combined amount of the aliphatic diene and ethylenically-unsaturated non-carboxylic comonomer constitute the major portion of the total monomeric mixture, i.e., at least about 90% of the mixture.

It has been found that use of less than 1 part N-methylolacrylamide per 100 parts of the monomeric mixture produces extremely poor foam structure. In fact, foam structure of desired quality is not obtained until at least 2 parts by weight of N-methylolacrylamide is used. The optimum value for this monomer is on the order of 3 parts.

Above 10 parts by weight of N-methyloloacrylamide (i.e., 10% of the mixture) the viscosity of the latex becomes extremely high and consequently difficult to produce acceptable foam formulations.

The amounts of aliphatic diene and non-carboxylic monomer used in producing the foam-forming latices are governed primarily by the strength and elastomeric requirements. Less than 30% by weight of the diene gives a product that is resinous and substantially non-elastomeric. A diene content above 70%, provides a polymer that is too soft with poor scuff and abrasion resistance.

The diene, the ethylenically unsaturated comonomer, and N-methylolacrylamide are advantageously emulsion copolymerized by using a seeded recipe and a neutral aqueous medium containing emulsifiers stable therein. Seeded polymerization recipes are employed since they insure obtaining a latex having a high solids content with low viscosity. It has been found that the non-compounded latex should preferably have a minimum solids content of about 50% with a viscosity of about 1000 centipoises and not greater than about 2000 centipoises to produce good foam structures.

The amounts of emulsifier initially added to the system is kept low to obtain large particle size in the polymer. In general, from about 0.3 to 1.0 parts of the emulsifier and preferably from 0.3 to 0.6 parts, based on 100 parts of the monomers charged are used. Suitable emulsifiers include the ethers and esters of polyglycols with aliphatic acids having from 10 to 20 carbon atoms; alkyl sulfates where the alkyl group contains from 10 to 20 carbon atoms, alkaryl polyether sulfates or sulfated monoglycerides and similar emulsifiers that will occur to those skilled in the art. A particularly effective type of anionic emulsifier system has been found to be an alkali metal salt of an alkyl sulfate, e.g. sodium lauryl sulfate. The polymerization system may also include small amounts of stabilizers known to the art, e.g. Tamol SN. Also, non-nonic heat stable emulsifiers such as Lipal 50–OA, an ethoxylated decyl alcohol may be used in the polymerization recipe to improve the foam structure.

The polymerization reaction usually is promoted by the addition of free radical yielding initiators such as the alkali persulfates, percarbonates, perborates, and the like; organic peroxides, such as benzoyl peroxide, acetyl peroxide and the like; alkyl peroxides such as di-t-butyl peroxide; and organic hydroperoxides such as diisopropyl benzene hydroperoxide. Redox systems of initiation may be employed utilizing the above-mentioned substances with suitable reducing agents well known in the art. Incremental additions of the initiator and the emulsifier are often particularly effective.

The quantity of initiator included in the aqueous emulsion polymerization recipes varies over a wide range, but in most cases an initiator concentration of between about 0.02 and 3.0 percent by weight based on the weight of total monomer charge is satisfactory, with 0.05 to 0.5 percent by weight of initiator being the preferred range.

The monomeric reaction mixtures will also contain small amounts, e.g. about 0.01 to 0.5 part per 100 parts of the monomer charge of the sulfhydryl-group-containing compounds termed "modifiers" in the synthetic rubber industry such as alkyl mercaptans containing from about 10 to 22 carbon atoms, for example, n-dodecyl mercaptan, the commercially available mixed tertiary mercaptans containing from 12 to 16 carbon atoms, thiophenol, alpha- or beta-thionaphthol, and the like. The polymerization can be effected within a wide range of temperatures, for example, within the range of from about 0° to about 100° C. and preferably from about 60° to 80° C. Under such conversion conditions, it has been found that high conversions can be obtained and it is the usual practice to continue polymerization until conversions of 70 to 100 percent are reached. Conventional short-stopping agents such as hydroquinone, sodium sulfide, tetramethyl thiuram disulfide, or sodium dimethyl dithiocarbamate and the like may be added to the polymerization system to control the level of conversion. However, this is ordinarily neither preferred nor particularly advantageous in most latex foam systems. Furthermore, the polymerization reaction as heretofore described is usually improved by the use of a seed latex, i.e., a small amount of preformed latex having the desired monomer ratio. The seed latex is added to the monomeric charge prior to effecting polymerization.

The amount of water used in the polymerization system may be varied considerably depending on the solids content desired in the resulting latices. In general, from about 100 to 200 parts of water per hundred parts of monomeric mixture are used to produce latices having a solids content of from about 40 percent to about 60 percent by weight.

After the polymerization reaction has obtained the desired conversion level, the unreacted monomers and some water are removed by vacuum stripping to produce a copolymer in the form of a latex or dispersion of small droplets or globules within an aqueous phase.

The synthetic latex thus prepared is then usually treated by alkalinizing the latex, e.g., with ammonium hydroxide, to a pH of from about 8.5 to about 9.5. A pH of from about 9.0 to 9.5 is generally preferred. At a higher pH the system tends to coagulate and an acid pH causes the latex to be unstable.

The carboxylated film-forming elastomeric secondary polymer latices or aqueous dispersions useful in this invention, which have pendant carboxylic acid groups on the polymer chain, can be prepared by effecting emulsion polymerization of the appropriate monomeric mixture in an acidic aqueous system containing one or more suitable emulsifiers. Except for the use of an acidic medium, the conditions of polymerization are generally the same as those used for the primary latex. It will be appreciated, however, that the emulsifier used in these secondary acid latices must be compatible with those used to prepare the primary latices in order to provide a stable latex mixture.

The acid latices suitable for this invention are prepared from monomeric mixtures containing at least one carboxyl-containing unsaturated monomer and at least one aliphatic conjugated diene and an ethylenically unsaturated monomer of the type used to produce the N-methylolacrylamide terpolymer latices.

The carboxyl-containing monomers that can be used to prepare the secondary carboxylic latices of this invention include a variety of unsaturated monocarboxylic and polycarboxylic acids and the partial esters of the polycarboxylic acids. In general, suitable acids are characterized by possessing one or more olefinic carbon-to-carbon double bonds and one or more carboxyl groups in which at least one of the olefinic carbon-to-carbon double bonds are activated, as is understood in the polymerization art, to render the acid copolymerizable with the diene and the olefinically unsaturated comonomer.

Representative examples of the useful monocarboxylic acids are acrylic and substituted acrylic acid and other copolymerizable ethylenically unsaturated monocarboxylic acids, such as crotonic acid, alpha-chlorocrotonic acid, hydrosorbic acid, cinnamic acid, m-chlorocinnamic acid, p-chlorocinnamic acid, acrylic acid, alpha-chloroacrylic acid, methacrylic acid, ethacrylic acid, (vinyl) thiophenic acid, alpha-(furyl)acrylic acid, (vinyl)furoic acid, (p-vinyl) benzoic acid, (vinyl)napthoic acid, alpha-(isopropenyl)acrylic acid, alpha-(styrenyl)acrylic acid, 2-carboxy-4-phenyl-1, 3-butadiene, sorbic acid, alpha-(methyl)sorbic acid, alpha-(ethyl)sorbic acid, alpha-chlorosorbic acid, alpha-bromosorbic acid, beta-chlorosorbic acid, alpha-, beta-, or gamma,epsilon(dimethyl) sorbic acids, 2,4-heptadienoic acid, and alpha- and beta-(vinyl)acrylic acids.

Exemplary of the olefinically unsaturated polycarboxylic acids are fumaric, maleic, mono- and dichloromaleic, citraconic, mesaconic, itaconic, aconitic, ethylmaleic, methylitaconic, muconic, hydromuconic, glutaconic, 2-carboxy-2,4-pentadienoic, beta-(p-carboxylphenyl) acrylic, and 2,4-pentadien-1,3-dioic acids; and dimers and trimers of methacrylic acid and other monoolefinic and polyolefinic polycarboxylic acids. Monoolefinic acids are preferred for many applications using carboxylic latices. The utilization of these copolymerizable polybasic acids or their anhydrides which are readily hydrolyzed in the acidic polymerization provides a means for direct introduction of the polycarboxylic acid groups into the polymer chain.

The partial esters of unsaturated polycarboxylic acids employed in this invention may be prepared from unsaturated carboxylic acids having two or more carboxyl groups or the anhydrides thereof. It will be understood that the expression "partial ester of an unsaturated polycarboxylic acid" refers to those compounds in which at least one carboxyl group is unreacted. As noted above, examples of unsaturated polycarboxylic acids include fumaric, maleic, glutaconic, citraconic, itaconic, mesaconic, aconitic, and the like, with fumaric, maleic, and itaconic acids being particulraly preferred for the purposes of preparing partial esters. Although many compounds containing hydroxyl groups may be considered as alcohol components useful to esterify at least one of the carboxyl group in the polycarboxylic acids, the aliphatic saturated and-unsaturated alcohols containing from 1 to about 20 carbon atoms, and preferably from 1 to 10 carbon atoms are found the most preferable.

The partial esters employed are preferably the "half esters" or monoesters prepared from unsaturated acids containing two carboxylic groups.

Acrylic acid is a particularly preferred monomer for producing the secondary component lattices of this invention. Advantageously, it has been found that selected blends of this monocarboxylic monomer and other unsaturated carboxyl-containing monomers are also particularly effective for producing foam structures.

The amounts of carboxyl-containing unsaturated monomer, aliphatic diene, and ethylenically unsaturated comonomer used in the preparation of carboxylic latices may be varied over a relatively wide range. Generally, the acid-containing monomeric mixtures contain from about 25 to about 89.5% by weight of the conjugated diene or mixture thereof; from about 10 to about 70% by weight of ethylenically-unsaturated comonomer, and from about 0.5 to about 20% by weight of the carboxyl-containing unsaturated monomers. The total amounts of the aliphatic diene and ethylenically-unsaturated comonomer constitute the major portion of the acid-containing monomeric mixture, i.e., on the order of at least about 80% of the mixtures.

As heretofore described, in preparing foams of this invention, the primary (and if employed, the secondary) latices must be compounded with a curing system, a foam stabilizer, and a foaming agent or aid.

Foaming agents useful in the practice of this invention includes a number of alkyl sulfates of alkali metals in which the alkyl radical has from 10 to 14 carbon atoms, such as sodium decyl sulfate, sodium lauryl sulfate, and sodium tetradecyl sulfate; alkali metal salts of esters of sulfo-substituted fatty acids having from 10 to 16 carbon atoms; alkali metal salts of unsaturated or saturated fatty acids having more than 14 carbon atoms, such as potassium oleate or sodium palmitate; and alkali metal salts of condensation products from ethylene oxide and aliphatic alcohols of from 10 to 18 carbon atoms, e.g. Lipal 50–OA. It will be appreciated that these surfactants are also used as emulsifiers during polymerization. Additional surfactant is, however, needed to enable foaming of the latex.

For the purposes of this invention, the alkali metal alkyl sulfates are particularly preferred, especially sodium and potassium lauryl sulfates. The amount of foaming agent present in the latex prior to foaming is critical and may vary from 0.5 to 5.0% of the combined weights of emulsifier in the primary and secondary polymer latices and the post-added surfactants. Preferably, the total amount is in the range near 1–2% of the foam formulation.

The thermo-setting foam stabilizers useful in preparing the foams of this invention include cellulose-derived ethers and poly(alkylene oxide) derivatives such as condensation products from ethylene oxide and propylene oxide, condensation products of ethylene oxide and alkyl phenols, polyethylene glycol alkyl ethers and polyethylene glycol alkyl aryl ethers, which are precipitated from aqueous solutions at temperatures below the boiling point of water.

Of the cellulosic derivatives useful as foam stabilizers in the practice of this invention, the mixed methyl and hydroxy-propyl-cellulose ethers prepared by reaction between cellulose, methanol, and propylene oxide are particularly preferred. These products are the so-called (hydroxypropyl) methoxycelluloses. However, methoxy- or ethoxycellulose and hydroxyethoxycellulose derivatives also may be used as foam stabilizers.

The weight of foam-stabilizing agent generally used in the practice of this invention is from 0.1 to 1.0% of the combined dry weight of polymer solids, but is preferably between 0.1 and 0.5. It will be understood that that amount of thermo-setting thickening agent used to stabilize the foam is critical in that it also regulates the viscosity of the latex prior to foaming. The viscosity of the latex at this stage may vary from about 2,000 to a maximum of about 12,000 centipoises. An optimum range for light weight foams is from about 2,000 to about 3,000 centipoises and for high density foams the range is from about 4,000 to 6,000 centipoises.

The curing system which is added to the latex foam formulation just before foaming includes sulfur-containing curing admixtures, reinforcing network resins, and mixtures thereof.

The curing network resins may include melamine resins, urea resins, melamine-formaldehyde condensates (e.g. the methylol melamine condensates) urea-formaldehyde condensates, alkylated melamine-formaldehyde condensates and urea-formaldehyde condensates, (e.g. methylated melamine-formaldehyde condensates), certain liquid epoxy resins, other amino-formaldehyde condensates such as the condensation products of ethylene diamine and formaldehyde, hexamethylene diamine-formaldehyde condensates and the like. As used herein, the curing agents are often in a "water-dispersible" condition, that is emulsified or dissolved in water or dissolved in water miscible solvents.

According to this invention, condensates of methylated trimethylol melamine or methylol melamine and blends thereof are particularly effective curing agents and are the preferred.

These resins are usually used in amounts from about 0.5 to about 10 parts by weight based on the total weight of the dry latex solids in the foam composition.

In the usual sulfur-containing system, the amount of sulfur may vary about 0.5 to 4 parts per 100 parts of latex solids in the foam-forming latex. Also polyvalent metal compounds such as the salts, basic oxides and hydroxides of calcium, magnesium, lead or zinc often are used in amounts varying from 0.5 to 10 parts. Preferably about 1.5 parts of sulfur and about 1.5 parts of zinc oxide are used to cure the primary latex. If the secondary acid-containing latex is also employed, then the amount of sulfur is reduced, e.g. 0.1–0.5 part, and about 1 to 6 parts of polyvalent metal oxide is utilized to promote bridging or cross-linking of the carboxyl groups in the acid copolymer chains.

Preferably, the latex compositions to be made into foams are compounded to also contain one or more curing agents. Thus it has been found that a complete resin cure produces a boardy less flexible foam; whereas a sulfur cure alone produces a more elastomeric foam. Advantageously, a combined sulfur and resin cure substantially enhances the heat-aging and compression resistance properties of the resulting foam. Therefore, it is preferable to employ a cure system containing from about 1.0 to 2.0 parts sulfur; 0.5 to 2.0 parts of a network resin such as a methylol melamine condensate and 1.0 to 2.0 parts of a polyvalent metal compound such as zinc oxide. Also, minor amounts of conventionally employed vulcanization aids and accelerators may be employed.

The basic foam-forming system containing the elastomeric latices, the foaming agent, and the thermo-setting agent may be compounded with other ingredients, depending upon the intended use of the resulting foam.

Where a fire-retardant foam is desired, the primary elastomer preferably contains up to about 40% of a halogenated comonomer such as vinylidene chloride and from about 50 to about 200 parts of aluminum oxide trihydrate is preferably admixed per 100 parts of dry elastomer. Where an energy-absorbing foam is required, such as for sound-proofing purposes, the primary elastomer may advantageously contain up to about 50% of styrene and may be further compounded with between 80 to 120% by dry weight of aluminum oxide trihydrate.

Anti-oxidants, such as alkylated phenol and bisphenol derivatives are advantageously added to stabilize the resulting foam product. Pigments, such as carbon black or whiting materials, may be added for the sake of appearance.

In compounding, it is necessary to regulate the amounts of filler and foaming agent added to control the viscosity of the mixture. Generally, the viscosity of the compounded latex should not exceed 6,000 centipoises on a Brookfield viscosimeter. Preferably, this viscosity is from 3,500 to 5,500 centipoises just prior to foaming.

After compounding, the latex mixture may be foamed or frothed using blowing agents and other techniques well known in the art for preparing various kinds of latex foams. The compounded latex may be also foamed by whipping air into it with a mixer or by using an apparatus provided with foam heads. The resulting foam is generally cast or otherwise deposited as a layer on a substrate, e.g., a continuous plastic web or a fibrous backing. The foam may adhere to the substrate or the substrate may have a releasable coating, if the foam film alone is desired.

The foam may be dried and cured in a continuous manner by placing in a heated oven or the like at a temperature of from about 100° F. to 350° F. for periods of a few minutes to an hour or more. The temperature chosen depends on the substrate used as well as on the combination of thermo-setting and foaming agents employed. The foams of the invention are preferably cured at temperatures between 250° and 300° F. for between 15 and 30 minutes.

Procedures for making the foam-forming latex composition of this invention, preparing the foams and applying to selected substrates, and modifying the foam compositions for desired results are described in the examples below.

Example I

This example illustrates the preparation of N-methylolacrylamide (MOAMD)-containing copolymer latices suitable for producing the foam-forming compositions of this invention by emulsion polymerization in a stirred neutral reactor (rinsed with a mixture of sodium lauryl sulfate and EDTA).

An aqueous solution consisting of 130 parts water and an emulsifying agent (0.3 part of sodium lauryl sulfate), a chelating agent (0.03 part of EDTA, i.e. ethylenediaminetetraacetic acid) and an anionic dispersant (0.5 part of a polymerized alkyl naphthalene sulfonic acid; Tamol SN, Rohm and Haas Co.) was charged to the reactor together with 5 parts of a seed latex (a copolymer of 1,3-butadiene [BD] and styrene [ST] made from a monomeric mixture of 60 parts of BD and 40 parts of ST.) Tetrasodium pyrophosphate (0.30 part) was added.

A modifier (0.2 part of a tertiary-dodecyl mercaptan) was added to the stirred mixture, followed by the addition of 50 parts BD, 46 parts ST and 4 parts MOAMD.

The contents of the reactor were then heated to 140° F. and a peroxygen type initiator (0.05 part of potassium persulfate) was injected.

At 17–22% conversion, 0.4 part of the emulsifier (i.e. sodium lauryl sulfate), was injected together with 0.02 part of the peroxygen initiator.

At 50–60% conversion, an additional 0.03 part of the peroxygen initiator was injected and the temperature was raised to 150° F. At 60–70% conversion, the temperature was raised to 150° F. The polymerization reaction was continued until a conversion of about 95% was obtained. At this conversion the agitation was stopped and the pH of the system was adjusted to 9.0–9.5 with ammonium hydroxide. Also, 0.4 part of diammonium phosphate and 0.8 part of sodium lauryl sulfate were added. The unreacted monomers and some water were then removed by vacuum stripping to produce a latex having a solids content of about 48%, expressed as weight of dry solids based on the total weight of latex. After stripping, the latex was concentrated to 56–57% solids.

Example II

In this example, a foam composition is prepared in accordance with the method of this invention from the primary latex of Example I.

The latex is admixed with 0.3 part of sodium lauryl sulfate, 0.1 part of formaldehyde, and 0.01 part of a bactericide and then adjusted to pH of 8.5–9.0 by adding ammonium hydroxide. This latex, designated as Latex A, is then initially compounded as follows:

TABLE 1

| Material: | Active dry parts |
|---|---|
| Latex A | 100.0 |
| Alkylated phenolic antioxidants | 3.00 |
| Nonionic surfactant (Lipal 50-OA) | 15.0 |
| Sodium lauryl sulfate (Aquarex WAQ, E. I. du Pont de Nemours and Co.) | 0.75 |
| Silicone lubricant | 1.00 |
| Sequestering agent | 0.30 |
| Clay (CWF) | 50.00 |
| Alumina | 50.00 |
| Whiting (calcium carbonate) | 58.00 |
| Hydroxypropoxyl - methoxycellulose (Methocel 65 HG; viscosity 4,000 centipoises, Dow Chemical Co.) | 0.25 |

This compounded latex was further admixed with an acceleration or cure system containing:

TABLE 2

| Material: | Active dry parts |
|---|---|
| Sulfur | 1.5 |
| Zinc diethyldithiocarbamate | 1.5 |
| Zinc salt of mercaptobenzothiozole | 1.5 |
| Zinc oxide | 1.5 |
| Methylol-melamine condensate resin (Cyrex 933) | 2.0 |
| Carbon black | 2.0 |
| Methocel 65 HG (to adjust viscosity). | |

The compounded latex was frothed in a planetary mixer to form a wet foam having a cup weight of about 25 grams per 60 milliliters, then cast in a 9/16 inch layer on a fibrous backing. The foam was cured in a Geer oven for 20 minutes at about 300° F. to effect drying, and curing. The resulting foam was of good quality exhibiting acceptable compression set (i.e. less than 20% loss) compression resistance (i.e. from 3 to 10 p.s.i.) and good heat aging (i.e. not cracked when flexed through 180° after aging at 275° F. for 96 hours).

EXAMPLE III

Experiments in this example show the preparation and evaluation of additional foams from a latex admixture of a primary latex (such as prepared in Example I) and a secondary carboxylated latex.

In these experiments compression set is determined as follows. Six foam specimens four inches square are each cut into four specimens two inches square, which are piled one upon another so that a skin side is next to a cut side to a pile height of approximately 1 inch. Two piles are prepared using specimens selected at random from the 24 specimens two inches square. The thickness of the plied specimens is determined at a load of 100 grams per square inch (p.s.i.). Using a fixture consisting of two parallel plates that are larger than the 2" x 2" specimens and spacer bars equal in thickness to 50% of the thickness of the plied specimens, the plied specimens are compressed to 50% of their original thickness under a 100 grams p.s.i. load. The thus compressed specimens are placed in a circulating air oven at 158±2° F. for 22±½ hours. When the specimens are removed from the oven, the fixture is unclamped immediately and the plied specimens are allowed to recover for 30 minutes at room temperature. If plies adhere together after the oven treatment, they are not separated before remeasuring.

The thickness under a load of 100 grams p.s.i. is determined. Compression set (in percent loss) is equal to 100 times the ratio of the difference in thickness after heating under pressure to the original thickness. The results reported represent the average from tests on two sets of plied specimens. The Rug Manufacturers' Association (R.M.A.) standard for acceptable compression set is not in excess of 15% loss, but compression set in the range of 20% loss is often considered acceptable for commercial purposes.

Compression resistance measurements are made using 2" x 2" foam specimens not used for the compression set test piled into plies approximately 1 inch thick. The plied specimens are placed in an Instron compression tester to determine the total thickness of the plied specimen at a load of 100 grams p.s.i. with a circular presser foot 1 square inch in area. The specimen is compressed to 75% of its original thickness using the 1 square inch presser foot and the load required to compress the specimen is determined. The difference between this reading and the 100 gram preload is the compression resistance of the foam. Compression resistance is reported as the average of the values obtained for two sets of plies. The R.M.A. standard for compression resistance is in excess of 5 p.s.i.

The other properties required to meet R.M.A. standards are a delamination strength greater than 2 pounds per inch width and an ash content below 50%.

In these experiments the N-methylolacrylamide-containing diene terpolymer employed differed from the latex produced in Example I in that 0.3 part of the mercaptan modifier were added to the polymerization recipe. This latex is designated as Latex B.

Latices C, D, and E are acid copolymer latices prepared from acrylic acid (AA), butadiene (BD) and either styrene (ST) or vinylidene chloride ($VCl_2$) by emulsion polymerization.

Mixtures of latices were blended as follows:

TABLE 3

| Blend No. | Active dry parts by weight | | | | | |
|---|---|---|---|---|---|---|
| | 1 | 2 | 3 | 4 | 5 | 6 |
| Latex B | 75 | 50 | 75 | 50 | 75 | 50 |
| Latex C [1] | 25 | 50 | | | | |
| Latex D [2] | | | 25 | 50 | | |
| Latex E [3] | | | | | 25 | 50 |

[1] Copolymer of 60BD/37.5 ST/2.5 AA.
[2] Copolymer of 50BD/47.5 ST/2.5 AA.
[3] Copolymer of 60BD/37.5 $VCl_2$/2.5 A.

Each of these blends and each latex (B, C, D, and E) was compounded according to the following formulation:

TABLE 4

| Material | Active dry parts by weight |
|---|---|
| Latex | 100.0 |
| Sodium lauryl sulfate | 0.50 |
| Nonionic surfactant [1] | 2.00 |
| Antioxidants [2] | 2.00 |
| Lubricant [3] | 1.00 |
| Whiting | 110.00 |
| Thermo-setting Agent [4] | 0.25 |
| Dicyamide | 1.0 |
| Sulfur cure system [5] | 3.0 |
| Zinc oxide | 1.0 |

[1] Lipal 50–OA.
[2] Equal mixture of Naugawhite and Nonox WSP.
[3] Silicone L–45.
[4] Methocel 65 HG.
[5] Mixture of 1.5 parts sulfur, 1.5 parts zinc diethyldithiocarbamate, and 1.5 parts of zinc salt of mercaptobenzothiozole.

These foam formulations were then foamed, cast into foam slabs of 3/16 inch thickness on jute backing, dried and cured in accoradnce with the procedure outlined in Example II. Evaluation of the resulting foams gave the following results:

TABLE 5

Compression set

| Foam sample: | Percent loss |
|---|---|
| Latex B | 7.8 |
| Blend No. 1 | 14.7 |
| Blend No. 2 | 9.8 |
| Latex C | 7.1 |
| Blend No. 3 | 3.7 |
| Blend No. 4 | 9.8 |
| Latex D | 15.7 |
| Blend No. 5 | 15.8 |
| Blend No. 6 | 19.1 |
| Latex E | 7.6 |

Compression resistance

| Foam sample: | P.s.i. |
|---|---|
| Latex B | 3.5 |
| Blend No. 1 | 5.9 |
| Blend No. 2 | 4.1 |
| Latex C | 7.9 |
| Blend No. 3 | 4.0 |
| Blend No. 4 | 6.2 |
| Latex D | 9.4 |
| Blend No. 5 | 4.6 |
| Blend No. 6 | 5.0 |
| Latex E | 6.1 |

It will be noted from the above data that all foam samples exhibited generally acceptable compression set and compression resistance. However, visual inspection of each foam revealed that an increase in carboxyl content caused objectionable surface cracking and also raised the compression resistance; those blends having a 1:1 ratio producing satisfactory foam quality.

Example IV

The experiments in this example illustrate the effects of different cure systems on the quality of the foam products of this invention.

The N-methylolacrylamide-containing diene terpolymer latex designated as Latex B in Example III was again adjusted to pH 8.5 to 8.8 and then compounded by following the formulation in Table 4, with the exception that 1.5 parts of the nonionic surfactant was used. This is designated as formulation A. Also, Latex B was compounded by replacing the sulfur cure system and zinc oxide with 7.5 parts of a network resin curing agent (a methylated trimethylol melamine condensate—Cyrex 933, sold by American Cyanamid Company). This is designated as foam formulation B. In foam formulation C, both cure systems of formulation's A and B are combined and in foam formulation D the amounts of the sulfur cure system ans the zinc oxide are doubled.

Each of these latex foam formulations was then foamed, cast into 3/16 inch thickness on a jute backing, dried and then cured for 20 minutes at 300° F.

Evaluation of the compression resistance of the resulting foam samples is tabulated in the following table:

TABLE 6

Compression resistance

| Foam formulation: | Average percent loss |
|---|---|
| A | 9.2 |
| B | 27.80 |
| C | 15.00 |
| D | 5.30 |

These data clearly show that compression resistance of a resinous cure may be above the acceptable maximum loss, i.e. 20% loss; whereas a sulfur or a combined sulfur and resin cure will be below this maximum. Thus it will be understood that a resin cure alone generally is not suitable for the purposes of this invention. Moreover, since the heat-aging properties of a foam cured by sulfur alone will usually be poor and not acceptable for all foam applications (that is the foam will crack after heat aging for 96 hours at 275° F.), it is preferable to employ a combined sulfur and resin cure.

Example V

In this example the amount of N-methylolacrylamide used to produce the primary elastomeric polymer of the invention was varied to determine the effects on the suitability of the copolymer as a foam-forming latex. The polymerization technique and recipe given in Example I were followed with the exception that the amount of modifier was increased to 0.3 part per 10 parts of latex solids, and the amount of N-methylolacrylamide was varied from 0 to 5 parts with a corresponding decrease in the butadiene from 54 to 49 parts. (The latices are respectively designated as latices, F, G, H, I, J and W.)

The resulting six latices were then compounded by following the foam formulation set forth in Table 4 with the exception that the viscosity of each formulation was determined on a Brookfield viscosimeter prior to the addition of the sulfur cure system and the zinc oxide. The viscosity of the accelerated foam formulations was then determined. Finally, demineralized water was added to each of the formulations to adjust the viscosity and to obtain a formulation capable of producing a wet foam having a cup weight of about 25 grams per 60 milliliters. These formulations were then foamed and attempts were made to cast foam slabs from each. It was found that at least two parts of MOAMD is necessary to obtain a viscosity suitable for making a foam slab. The different viscosities are tabulated below:

TABLE 7.—LATEX FOAM FORMULATIONS

| Latex | F | G | H | I | J | K |
|---|---|---|---|---|---|---|
| BD (parts by weight) | 54 | 53 | 52 | 51 | 50 | 49 |
| MOAMD (parts by weight) | 0 | 1 | 2 | 3 | 4 | 5 |
| ST (parts by weight) | 46 | 46 | 46 | 46 | 46 | 46 |
| Initial viscosity, cps.×10³ | 48.8 | 29.6 | 42.8 | 17 | 11.8 | 10.4 |
| Accelerated viscosity, cps.×10³ | 40.7 | 29.5 | 34 | 13.2 | 9.5 | 9.7 |
| Water adjusted viscosity, cps.×10³ | 17.9 | 16 | 11.1 | 5.4 | 5.7 | 5.9 |

From the above data, it will be observed that the viscosity of the foam formulation is reduced when the cure system is added. Moreover, Latex H prepared with 2 parts of the acrylamide monomer had a water adjusted viscosity of 11,600 centipoises. In contrast, latices F and G had water adjusted viscosities above 15,000 centipoises. Acceptable foam slabs could not be cast from these materials.

What is claimed is:

1. A stable foam-forming heat-curable latex composition which comprises an admixture containing (1) a blend of latices comprising (a) 50–75% by weight, basis polymer solids, of a diene terpolymer latex prepared by emulsion polymerization in an aqueous medium of a monomeric mixture containing from about 30 to 70% by weight of at least one aliphatic conjugated diene, from about 2 to about 10 by weight of N-methylolacrylamide, and a balance comprising at least one non-carboxylic ethylenically unsaturated monomer copolymerizable with the diene and N-methylolacrylamide and (b) 25–50% by weight, basis polymer solids, of an elastomeric carboxylated diene film-forming latex (2) minor amounts of a curing system capable of curing the diene terpolymer latex, (3) a foaming agent selected from the group consisting of anionic and nonionic surfactants, and (4) a thermosetting foam stabilizer.

2. The latex composition of claim 1 in which said admixture contains from about 0.5 to 5% by weight of the foaming agent and from 0.1 to 1% by weight of the stabilizer, said weight percentages being based on the total weight of polymer solids in said admixture.

3. The latex composition of claim 1 in which the diene contains from 4 to 10 carbon atoms, and the non-carboxylic monomer is selected from a group consisting of styrenes, nitriles, halogen-containing aliphatic monomers and low molecular weight alkyl acrylates.

4. The latex composition of claim 1 in which the monomeric mixture contains an aliphatic halogen-containing monomer as said monomer, the amount of said halogen-containing monomer varying from about 30 to about 45% by weight of said monomeric mixture whereby a fire-retardant foam is obtainable from said composition.

5. The latex composition of claim 1 in which said latex has a solids content ranging from about 40 to 60% by weight o fthe weight of the latex.

6. A method for producing elastomeric no-gel foams which comprises (A) admixing selected proportions of (1) a blend of latices comprising (a) 50–75% by weight, basis polymer solids, of a diene terpolymer latex produced from a monomeric mixture containing from about 30 to 70% by weight of at least one aliphatic conjugated diene, from about 2 to 10% by weight of N-methylolacrylamide and a balance comprised of at least one non-carboxylic ethylenically unsaturated monomer copolymerizable with the diene and N-methylolacrylamide, and (b) 25–50% by weight, basis polymer solids, of an elastomeric carboxylated diene film-forming latex, (2) a curing agent capable of curing the diene terpolymer latex; (3) a foaming agent selected from the group consisting of anionic, and nonionic surfactants; and (4) a foam stabilizer which is thermo-setting thickening agent; (B) forming said admixture into a foam and (C) thereafter cell-stabilizing, drying, and curing the foam by the application of heat.

7. The method of claim 6 in which said admixture contains from about 0.5 to 5% by weight of the foaming agent and from 0.1 to 1% by weight of the stabilizer, said weight percentages being based on the total weight of polymer solids in said admixture.

8. The method of claim 6 in which the diene contains from 4 to 10 carbon atoms and the monomer is selected from a group consisting of styrenes, nitriles, halogen-containing aliphatic monomers and low molecular weight alkyl acrylates.

9. The method of claim 6 in which the monomeric mixture contains an aliphatic halogen-containing monomer as said monomer, the amount of said halogen-containing monomer varying from about 30 to about 45% by weight of said monomeric mixture whereby a fire-retardant foam is obtainable from said admixture.

10. The method of claim 6 in which said latex has a solids content ranging from about 40 to 60% by weight of the weight of the latex.

11. The method of claim 6 in which the foamed admixture is heated at a temperature of from about 100° to 350° to effect curing thereof.

12. A stable wet latex foam which comprises (1) a blend of latices comprising (a) 50–75% by weight, basis polymer solids, of a diene terpolymer latex prepared by emulsion polymerization in an aqueous medium of a monomeric mixture containing from about 30 to 70% by weight of an aliphatic conjugated diene, from about 2 to about 10% by weight of N-methylolacrylamide and a balance comprising a non-carboxylic ethylenically unsaturated monomer copolymerizable with the diene and N-methylolacrylamide, and (b) 25–50% by weight, basis polymer solids, of an elastomeric carboxylated diene film-forming latex, (2) a curing agent capable of curing the diene terpolymer latex, (3) from about 0.5 to 5% by weight of a foaming agent selected from the group consisting of anionic and nonionic surfactants and (4) from 0.1 to 1% by weight of a thermo-setting foam stabilizer, said weight percentages being based on the total weight of polymer solids in said admixture.

13. The foam of claim 12 in which the curing agent comprises a sulfur-containing curing system.

14. The foam of claim 12 in which the curing agent comprises a mixture of a sulfur-containing curing system and a reinforcing network resin.

15. The foam of claim 12 in which the diene contains from 4 to 10 carbon atoms and the monomer is selected from a group consisting of styrenes, nitriles, halogen-containing aliphatic monomers and low molecular weight alkyl acrylates.

16. The foam of claim 12 in which the monomeric mixture contains an aliphatic halogen-containing monomer as said monomer, the amount of said halogen-containing monomer varying from about 30 to about 45% by weight of said monomeric mixture whereby a fire-retardant foam is obtainable from said admixture.

17. The foam of claim 12 in which said latex has a solids content ranging from about 40 to 60% by weight of the weight of the latex.

References Cited
UNITED STATES PATENTS

| | | | |
|---|---|---|---|
| 3,491,033 | 1/1970 | Dunn | 260—2.5 L |
| 3,215,647 | 11/1965 | Dunn | 260—2.5 L |
| 3,344,103 | 9/1967 | Eilbeck et al. | 260—80.7 |

JOHN C. BLEUTGE, Primary Examiner

W. J. BRIGGS, Sr., Assistant Examiner

U.S. Cl. X.R.

161—159; 260—2.5 H, 2.5 HB, 2.5 N, 17.4 BB, 17 R, 29.4 UA, 29.7 D, 29.7 H, 29.7 T, 29.2 EP, 2.5 FP, 29.7 M, 836, 852, 856, 894

UNITED STATES PATENT OFFICE
CERTIFICATE OF CORRECTION

Patent No. 3,740,357  Dated June 19, 1973

Inventor(s) Ludwig A. Wax

It is certified that error appears in the above-identified patent and that said Letters Patent are hereby corrected as shown below:

Column 9, line 13, "150° F." should read -- 160° F. --; Table 1, line 4, "15.0" should read -- 1.50 --. Column 12, line 2, "ans" should read -- and --; line 36, "10" should read -- 100 --; line 40, "W" should read -- K --; line 68, "11,600" should read -- 11,000 --.

Signed and sealed this 26th day of February 1974.

(SEAL)
Attest:

EDWARD M. FLETCHER, JR.          C. MARSHALL DANN
Attesting Officer                Commissioner of Patents